(12) United States Patent
Duclos et al.

(10) Patent No.: US 6,246,744 B1
(45) Date of Patent: Jun. 12, 2001

(54) CUBIC GARNET HOST WITH PR ACTIVATOR AS A SCINTILLATOR MATERIAL

(75) Inventors: Steven Jude Duclos, Clifton Park; Alok Mani Srivastava, Schenectady, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/306,025

(22) Filed: May 6, 1999

(51) Int. Cl.$^7$ ................................................ C09K 11/80
(52) U.S. Cl. ..................... 378/19; 378/98.8; 250/363.04; 252/301.4 R
(58) Field of Search ................ 378/19, 98.8; 250/361 R, 250/363.04, 367, 483.1; 252/301.4 R

(56) References Cited

U.S. PATENT DOCUMENTS

| | | | |
|---|---|---|---|
| 4,093,890 | * 6/1978 | Verriet et al. ................. | 252/301.4 R |
| 5,057,642 | * 10/1991 | Johnson et al. ................. | 585/823 |
| 5,318,722 | * 6/1994 | Tsoukala et al. ............. | 252/301.4 R |
| 5,360,557 | * 11/1994 | Tsoukala et al. ................ | 250/361 R |
| 5,391,876 | * 2/1995 | Tsoukala et al. ................ | 250/361 R |
| 5,484,750 | * 1/1996 | Greskovich et al. .................. | 501/86 |

OTHER PUBLICATIONS

B.J. Green et al., The Luminescence of $Pr^{3+}$ in Garnet Phosphors, 85–2 Electrohem. Soc. Ext. Abs. 600–601 (1985).*

* cited by examiner

Primary Examiner—Robert H. Kim
Assistant Examiner—Drew A. Dunn
(74) Attorney, Agent, or Firm—Toan P. Vo; Noreen C. Johnson

(57) ABSTRACT

A transparent scintillator material for rapid conversion of exciting radiation, such as x-rays, to scintillating radiation. The scintillator material has a cubic garnet host, and has praseodymium as an activator. The scintillator material may be a polycrystalline ceramic material. The polycrystalline ceramic is formed by sintering a powder formed by precipitation. The scintillator material may be integrated into computed tomography (CT) equipment or other x-ray imaging equipment. The scintillator material may also be integrated into a fast response x-ray detector system.

39 Claims, 4 Drawing Sheets

CUBIC GARNET HOST WITH PR ACTIVATOR AS A SCINTILLATOR MATERIAL

FIELD OF THE INVENTION

The present invention is directed to a transparent solid scintillator material where the material contains praseodymium as an activator for rapid conversion of exciting radiation, specifically x-rays, to scintillating radiation. The present invention is also directed to an exciting energy detection device, specifically an x-ray detection device, which incorporates the scintillator material.

BACKGROUND

A luminescent material absorbs exciting energy of one type, and then emits electromagnetic energy. If the exciting energy is electromagnetic radiation, the luminescent material will absorb the exciting electromagnetic energy in one region of the electromagnetic spectrum and generally will emit energy in another region of the electromagnetic spectrum. A luminescent material in powder form is called a phosphor, while a luminescent material in the form of a transparent solid body is called a scintillator.

An impurity activated luminescent material is normally one in which a non-luminescent host material has been modified by including ions of an activator species within the host material. With an impurity activated luminescent material, the host material lattice of the luminescent material absorbs the incident photon and the absorbed energy may be accommodated by the activator ions or it may be transferred by the lattice to the activator ions. The luminescent activator ions are then raised to a more excited state. In returning to their less excited state, the ions emit a photon of luminescent electromagnetic energy.

The exciting energy for a luminescent material may come in the form of electrons, positrons, electromagnetic radiation, or other forms of energy. X-ray scintillators are formed from scintillator material which absorbs x-ray radiation and then emits electromagnetic scintillating radiation. Typically the electromagnetic scintillating radiation is in the visible region of the electromagnetic spectrum. A typical x-ray detector using an x-ray scintillator includes a scintillator material which absorbs x-rays and a photodetector which detects scintillating radiation emitted from the scintillator due to the absorption of the x-rays. In general, if the scintillator material absorbs more x-rays, the scintillator material will emit more scintillating radiation to the photodetector, and the signal output from the photodetector indicative of the scintillating radiation will be greater.

X-ray detectors using scintillator materials are often used in x-ray diagnostic devices such as medical diagnostic equipment or baggage inspection equipment. One particular application of x-ray scintillator materials is in medical imaging detectors such as computed tomography (CT) equipment. In a typical CT scanning system, an x-ray source and an x-ray detector array are positioned on opposite sides of the subject and rotated around the subject in fixed relation to each other. In a CT scanning system using a scintillator material the scintillator material of a cell or element absorbs x-rays incident on that cell and emits light which is collected by a photodetector for that cell. During data collection, each cell or element of the detector array provides an output signal representative of the scintillating radiation intensity in that cell of the array. These output signals are processed to create an image of the subject in a manner which is well known in the CT scanner art.

For medical imaging systems, such as CT scanners, the scintillator material should have a number of important characteristics. First, in x-ray based CT systems, it is desirable to absorb substantially all of the incident x-rays in the scintillator material in order to minimize the x-ray dose to which the patient must be exposed in order to obtain the computed tomography image. In order to collect substantially all of the incident x-rays, the scintillator material should be of a sufficient density to efficiently stop the x-ray photons.

Secondly, the scintillator material should have a good quantum conversion efficiency, i.e., the ratio of the number of scintillating radiation photons emitted to the number of x-ray photons absorbed should be high. If the quantum efficiency of a scintillator material is high, more scintillating radiation photons will be emitted, and consequently the number of scintillating radiation photons to be detected by the scintillating radiation detector will be advantageously higher.

A number of materials are known to be useful as a scintillator material for medical imaging detector applications, for example, yttrium gadolinium oxide $(Y,Gd)_2O_3$ doped with europium, and $Gd_2O_2S$ doped with praseodymium. Both of these materials have the density required to efficiently stop the x-ray photons, as well as efficient conversion of the x-ray energy absorbed in the scintillator material into visible light emission from the Eu and Pr activators. $(Y,Gd)_2O_3$:Eu, however, suffers from a long decay time of the Eu emission which limits its usefulness in applications when the x-ray signal is rapidly changing, as might be encountered in fast scan CT systems. $Gd_2O_2S$:Pr has a hexagonal crystal structure which generates scattering in a polycrystalline ceramic body thus reducing the efficiency with which the generated light can escape the body and strike the scintillating light photodetector.

Further complicating the choice of a scintillator material appropriate for a fast scan CT systems is the difficulty of predicting a priori which materials will have the properties mentioned above which are important for a fast scan CT system. For example, much characterization of luminescent materials has been done using ultraviolet (UV) radiation as the stimulating radiation because ultraviolet radiation is more easily produced than x-rays and is generally considered less harmful. Unfortunately, there are a number of materials which are luminescent in response to UV radiation stimulation which are not luminescent in response to x-ray stimulation. Consequently, for many materials, even that luminescent data which is available provides no assurance that the material will luminesce in response to x-ray stimulation.

Afterglow is a scintillator material property which is often undesirable in a CT, or other scanning systems. Afterglow in an x-ray detecting scintillator is the phenomena that luminescence from the scintillator due to x-ray excitation can still be observed a long time after the x-ray radiation is absorbed by the scintillator. Upon absorbing x-ray radiation the scintillator will emit light where the intensity of the light decays rapidly at an exponential rate. This first exponential rate of decay is the primary decay rate. Additionally, the scintillator will emit a lower intensity light where the light intensity decays much more slowly than the primary decay rate light. The more slowly decaying light is termed afterglow.

It is desirable that the afterglow be small so that the photodetector of a scintillator system is able to distinguish between the scintillating light of a present x-ray stimulation from that of a prior x-ray stimulation. This is particularly important for fast scanning systems where the time between sequential stimulations is small.

Radiation damage in an x-ray scintillator material is the characteristic of the scintillator material in which the quantity of light emitted by the scintillator material in response to the stimulating x-ray radiation changes after the material has been exposed to a high radiation dose. The radiation damage may be expressed as the percent decrease in intensity of the stimulated scintillating light emitted before and after a high dose of X-ray radiation exposure of the scintillator material. Thus, usefulness of an x-ray scintillator material will be greater for a lower radiation damage value, because the scintillator material can withstand a higher x-ray radiation dose without a change in the proportionality calibration between stimulating x-ray radiation intensity and scintillating light emitted.

SUMMARY

In view of the foregoing, it would be desirable to provide a scintillator material which has a fast primary decay time and is highly transparent. It would also be desirable to provide a scintillator material with a small afterglow and low radiation damage.

According to one embodiment of the invention a transparent solid scintillator material is provided. The solid scintillator material has a cubic garnet host. The solid scintillator material also contains praseodymium which acts as an activator.

According to another embodiment of the invention, a computed tomography system is provided. The computed tomography system includes an x-ray source, a transparent solid scintillator material, and a scintillating radiation detector which is optically coupled to the transparent solid scintillator material for detecting scintillating radiation. The solid scintillator material has a cubic garnet host. The solid scintillator material also contains praseodymium which acts as an activator.

According to yet another embodiment of the invention, a fast response x-ray detector is provided. The fast response x-ray detector includes a transparent solid scintillator material and a scintillating radiation detector optically coupled to the transparent solid scintillator material for detecting the scintillating radiation. The solid scintillator material has a cubic garnet host. The solid scintillator material also contains praseodymium which acts as an activator.

According to yet another embodiment of the invention, a process of making a transparent solid polycrystalline ceramic scintillator material is provided. In this process a phosphor powder of a cubic garnet host with praseodymium as an activator is formed. The phosphor powder is pressed to form a powder compact, and then sintered.

According to yet another embodiment of the invention a phosphor powder is provided. The phosphor powder has a cubic garnet host, and contains praseodymium which acts as an activator. The phosphor powder also includes an afterglow reducing element distributed within the cubic garnet host.

DETAILED DESCRIPTION OF THE PREFERRED EMBODIMENTS

Figure 1:
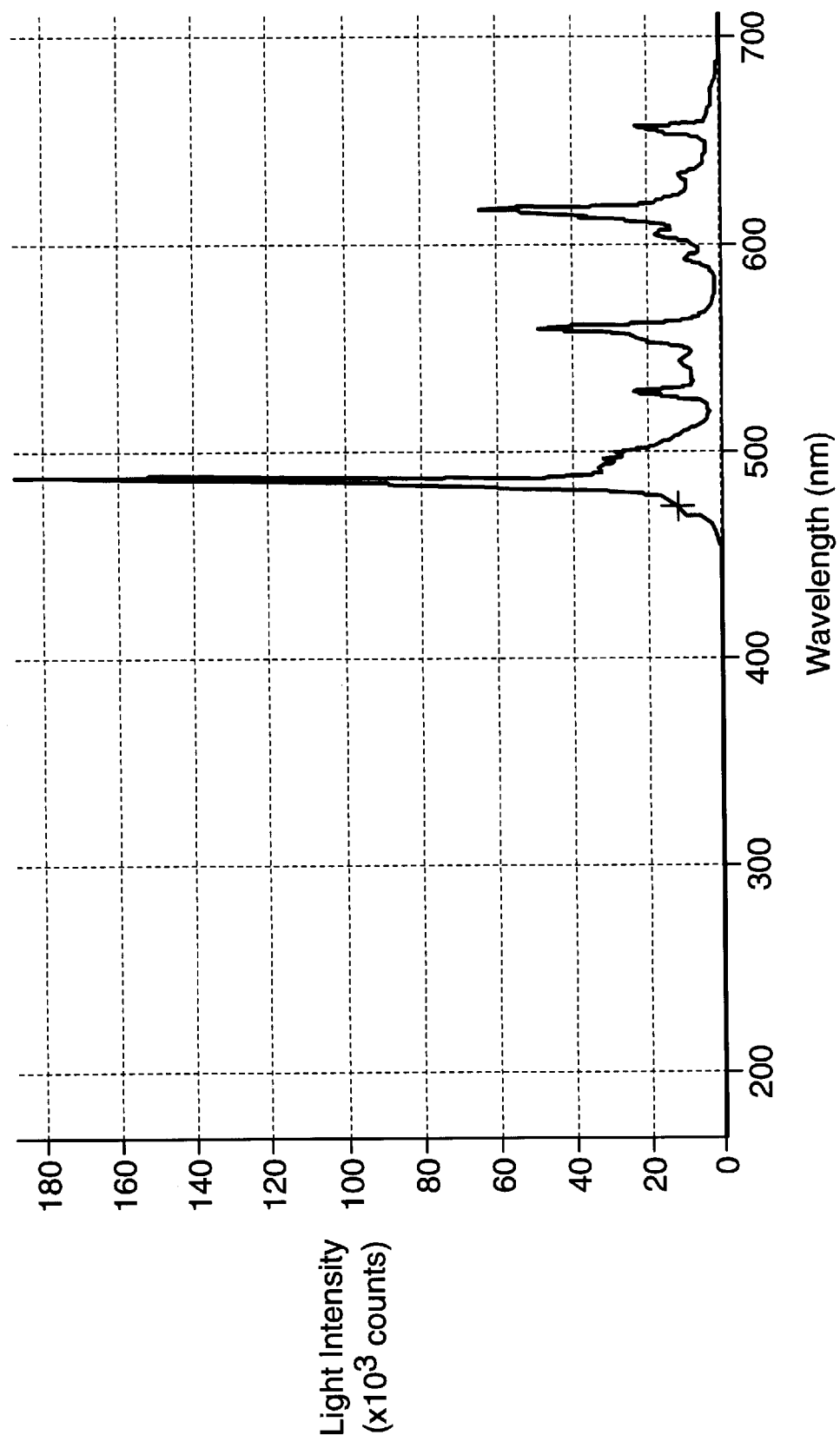
FIG. 1 is scintillating radiation spectra of gadolinium gallium garnet (GGG) powder containing a concentration of 0.5 mole percent praseodymium.

The scintillator material according to exemplary embodiments of the present invention generally has both a short primary decay time and good transparency qualities. The scintillator material preferably includes a cubic garnet host material which can be sintered to form a polycrystalline ceramic with a high transparency. Light scattering within the polycrystalline material is reduced because the host material has a cubic instead of a hexagonal crystal structure. Garnets are a class of materials with the crystal chemical formula $A_3B_5O_{12}$ in which the A cations are eight coordinated with oxygens and the B cations are either octahedrally (six) or tetrahedrally (four) coordinated with oxygens. The crystal structure is cubic with 160 ions per unit cell containing eight formula units. Suitable cubic garnet host materials for the present invention include gadolinium gallium garnet ("GGG")($Gd_3Ga_5O_{12}$), gadolinium scandium gallium garnet ($Gd_3Sc_2Ga_3O_{12}$), gadolinium scandium aluminum garnet ($Gd_3Sc_2Al_3O_{12}$), lutetium aluminum garnet ($Lu_3Al_5O_{12}$), and yttrium gallium garnet ($Y_3Ga_5O_{12}$), for example. In the above examples, the B site (i.e. in the generic formula $A_3B_5O_{12}$) may be occupied by two elements (e.g. $Sc_2Ga_3$ in gadolinium scandium gallium garnet). In other garnets, the A site may be occupied by two elements. In accordance with exemplary embodiments of the present invention the luminescence activator is preferably praseodymium.

In this disclosure, the concentration of the activator is expressed in terms of mole percent. Mole percent refers to the mole percent of the activator relative to the A site in the garnet $A_3B_5O_{12}$. For example 5.0 mole percent praseodymium in GGG means that 5 mole percent of the gadolinium is replaced with an equal number of moles of praseodymium.

In addition to the luminescence activator praseodymium, other elements may be included in the host material. For example, ytterbium, samarium, and europium may be added to reduce afterglow of the scintillator material.

The scintillator material of the present invention may be made, for example, of polycrystalline ceramic material. Techniques for making polycrystalline ceramic scintillator materials with cubic garnet hosts are known and disclosed, for example, in U.S. Pat. No. 5,484,750. Single crystalline garnet materials may be formed by techniques such as those disclosed in U.S. Pat. No. 5,057,642.

Processes for making the scintillator material of the present invention of a polycrystalline ceramic material are similar to those disclosed in U.S. Pat. No. 5,484,750 and are as follows. In these processes, a source hydrochloric acid solution is formed of the desired cations in appropriate quantities. Appropriate quantities means relative concentrations which result in the final transparent body containing the desired relative proportions of cations. Thus, in those situations where cations are present in the same relative concentrations in the final transparent body as they are in the hydrochloric acid solution of the source cations, it is that relative concentration which is desired in the hydrochloric acid solution. In those situations where the quantity of one or more cations decreases relative to the quantity of other cations during the process of converting the source hydrochloric acid solution into the final transparent polycrystalline body, then appropriate quantities in the hydrochloric acid starting solution are those quantities which result in the final transparent garnet body having the desired composition.

The source compounds are preferably 99.99% or higher purity in order to minimize the unknown/uncontrolled impurities present in the final composition which can affect radiation damage, afterglow and quantum efficiency.

One way of forming this source hydrochloric acid solution is by dissolving the source cations in the form of oxides in hot concentrated hydrochloric acid. For those situations where a closely controlled final garnet composition is desired, especially where the absence of impurities is considered desirable, use of source compounds which are of 99.99% or higher purity is preferred. Naturally, the source cations may be provided as chlorides rather than oxides, if desired. The praseodymium activator can also be added to the source hydrochloric acid solution, for example as praseodymium chloride, praseodymium nitrate, or praseodymium oxide. Once the source materials have completely dissolved in the hot concentrated hydrochloric acid, the resulting solution is cooled to room temperature. The resulting solution should be clear and free of precipitates or settling out of any of the source material. In the event that precipitation or settling out of source material occurs, the solution should be reheated, and additional hydrochloric acid added to the solution so that upon cooling to room temperature again, no precipitation or settling out occurs. That is, enough hydrochloric acid should be used to ensure that the source materials are not present at or above their solubility limit at room temperature.

Separately, an ammonium oxalate $(NH_4)_2C_2O_4$ solution can be formed by dissolving ammonium oxalate or individual amounts of ammonia and oxalic acid. Enough ammonium oxalate should generally be prepared to ensure complete reaction with the cation-containing chloride solution. This ammonium oxalate solution typically has a pH between about 7.5 and about 9.5. It is considered preferable that the pH of this ammonium oxalate solution be between 8.0 and 8.5.

When making small batches, the chloride cation source solution was dripped into this ammonium oxalate solution while the ammonium oxalate solution was being stirred. A white precipitate formed instantly upon contact between the two solutions. The inclusion of a magnetic stirring rod in the mixing container is a preferred method of mixing these solutions where small quantities are being prepared. Once all of the chloride source solution has been added to the ammonium oxalate solution, the precipitate formation is complete.

During the process of adding the chloride source solution to the ammonium oxalate solution, the pH of the oxalate solution is preferably monitored with a pH meter and maintained at a pH between 8.0 and 8.5 by addition of ammonium hydroxide to the solution as required.

During the precipitation step, the precipitate forms in small enough particles that initially, a colloidal suspension of the precipitate in the oxalate solution is present. Following the completion of the precipitation step, this colloidal suspension will slowly settle out to leave a white precipitate at the bottom of the container and a clear solution above it. This settling process can be accelerated by filtering and/or centrifuging the precipitate-containing liquid.

If desired, the precipitate may be water and/or alcohol washed before separating the precipitate from the liquid. This is done by allowing the precipitate to settle, pouring off or otherwise removing most of the liquid and adding the wash water or alcohol, allowing the precipitate to settle again, and again removing the clear liquid. Where high purity and/or closely controlled composition of the final transparent garnet is desired, the wash water should be high purity, deionized water and the alcohol should be of standard reagent grade purity. This washing process removes excess ammonium oxalate and reaction products such as ammonium chloride from the precipitate. The precipitate is then separated from the wash solution by filtering, centrifuging or other appropriate techniques. This precipitate is a multi-component precipitate having a substantially uniform chemical composition. This wet precipitate is at present believed to be a complex of ammonium gadolinium-gallium oxalate (when preparing gadolinium gallium garnet (GGG)), however, the detailed chemical compound composition or structure of this precipitate does not need to be known for the success of this process. This precipitate is preferably dried, such as by oven drying at a temperature of approximately 110° C. for a day or by vacuum drying. This dried precipitate is then heated in air to a temperature of about 750° C. to thermally decompose it. When the dried precipitate is ammonium gadolinium-gallium oxalate containing praseodymium, the thermal decomposition results in a powder of GGG containing praseodymium, where the powder is a phosphor powder.

If these resulting powders are die or isostatically pressed at pressures up to 60,000 pounds per square inch (psi) to form powder compacts for sintering with relative densities generally of up to about 55% and the compacts are sintered at temperatures of 1,500 to 1,650° C. in oxygen, the resulting ceramic body is typically opaque to translucent with relatively high amounts of residual porosity located within the garnet grains of the microstructure.

This powder may be directly pressed to produce a compact for sintering. However, it is preferred to first mill this powder either in a ball mill using zirconia grinding media and a liquid vehicle such as methyl or isopropyl alcohol. Ball milling times from about 4 to 24 hours are effective. Alternatively, fluid energy milling or jet milling may be used with pressure settings of from about 60 to about 100 psi.

The particle size distribution of these milled powders ranged between about 0.1 and 2 microns which indicates that agglomerates of the powder after the milling are much smaller than they were in the unmilled powder. Powder compacts pressed from this milled powder can be sintered to full theoretical density at temperatures between 1,400 and 1,600° C. in oxygen. Higher temperatures may also be used, if desired.

The highest optical transparency garnet ceramics are generally produced by a method involving sintering the pressed compact at temperatures ranging from 1,400 to 1,525° C. for 1 to 3 hours in oxygen. After the compacts have been sintered to densities between about 95% and 98% of theoretical density and to the closed pore stage, they were hot isostatic pressed. The hot isostatic pressing was done by loading the sintered compacts into a molybdenum crucible and packing them with $Gd_2O_3$ powder to prevent possible contamination from the atmosphere inside the hot isostatic pressing (HIP) furnace. These samples were then hot isostatic pressed at 5,000 to 25,000 psi in argon gas at temperatures of about 1,350 to 1,600° C. for soak times 15 to 60 minutes at the maximum temperature. Following the hot isostatic pressing, the ceramic bodies typically have a thin, white surface coating. This surface coating is removed by light mechanical grinding.

If the host material is GGG the preferred concentration of praseodymium is 0.01 to 5.0 mole percent, more preferably 0.5 to 2.0 mole percent. Afterglow reducing elements or radiation damage reducing elements may also be added as additives to the scintillator material to reduce afterglow, for example as oxides or chlorides to the source hydrochloric acid solution. If the host material is GGG with Pr as an activator, appropriate afterglow reducing elements include ytterbium, yttrium, thulium, samarium, and europium, and appropriate radiation damage reducing elements include thulium, for example.

GGG powder with 0.5 mole percent praseodymium was prepared according to techniques discussed above. X-rays were directed at the powder phosphor material, and the scintillating radiation spectra of the powder was measured. FIG. 1 shows a scintillating radiation spectrum for the 0.5 mole percent praseodymium GGG powder. The scintillating radiation spectrum is indicative that the scintillating radiation was due to praseodymium.

Figure 2:
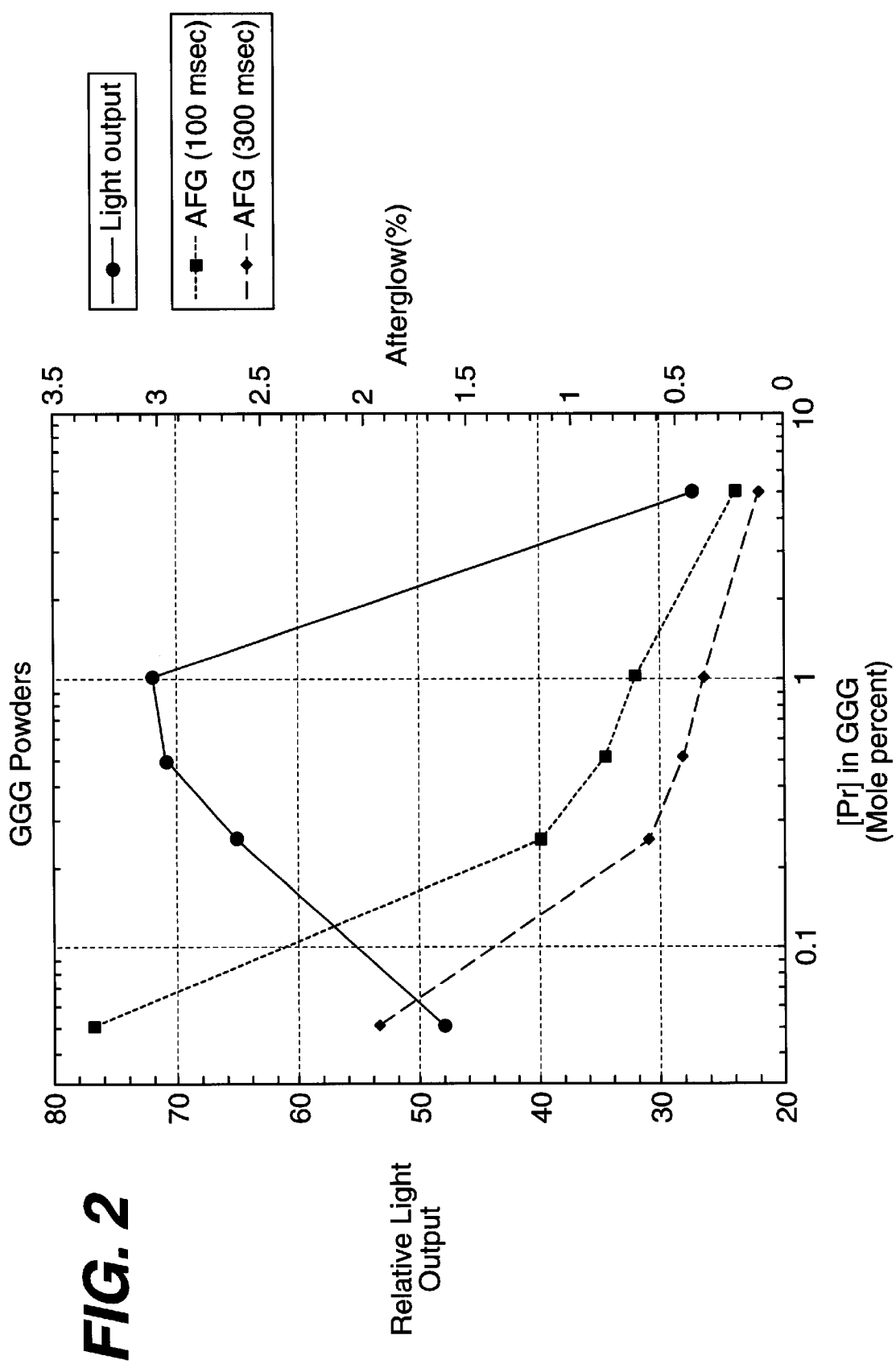
FIG. 2 is graph showing the relative light output and afterglow of GGG powders with various concentrations of praseodymium.

GGG powder samples with a concentration of praseodymium ranging from 0.05 to 5.0 mole percent were also prepared. The relative light output and afterglow of these powders at 100 milliseconds and 300 milliseconds were measured. FIG. 2 shows the results of these measurements. The afterglow of the powders decreases steadily as the concentration of the praseodymium increases from 0.5 to 5.0 mole percent, while the relative light output reaches a maximum at around 0.5 to 1.0 mole percent. The primary decay time of the scintillating radiation of these powders was found to be about 10 microseconds.

EXAMPLES

Samples of scintillator material with a gadolinium gallium garnet (GGG) host were prepared, as shown in Table 1 below. The mole percent of praseodymium in the GGG ranged from 0.05 to 5.0. Two of the samples (6 and 7) were doped with europium and samarium respectively to reduce afterglow. The host material, mole percent of praseodymium, additives and amounts if any, relative light intensity output, and afterglow at 100 and 300 milliseconds of the scintillator samples are listed in Table 1. A sample of gadolinium scandium gallium garnet with 1.0 mole percent praseodymium is also listed in Table 1 (sample 8).

TABLE 1

| Sample No. | Host material | Pr (mole %) | Additives (mole ppm) | Rel. Int. (%) | Afterglow 100 msec, 300 msec (%) |
|---|---|---|---|---|---|
| 1 | GGG | 0.05 | none | 58 | 3.33, 1.95 |
| 2 | GGG | 0.25 | none | 68 | 1.16, 0.64 |
| 3 | GGG | 0.5 | none | 62 | 0.85, 0.48 |
| 4 | GGG | 1.0 | none | 80 | 0.7, 0.37 |
| 5 | GGG | 5.0 | none | 28 | 0.21, 0.1 |
| 6 | GGG | 1.0 | Eu, 150 | 54 | 0.48, 0.26 |
| 7 | GGG | 1.0 | Sm, 150 | 63 | 0.54, 0.28 |
| 8 | $Gd_3Sc_2Ga_3O_{12}$ | 1.0 | none | 16 | 1.49, 1.01 |

Table 1 shows that the best relative light intensity results for the GGG host material were obtained for a praseodymium concentration of 1.0 mole percent. The afterglow decreased as the concentration of praseodymium increased in the GGG host material, with the lowest afterglow at 5.0 mole percent praseodymium (sample 5). However, the relative light intensity of the GGG scintillator material decreased as the concentration of praseodymium increased from 1.0 to 5.0 mole percent.

In samples 6 and 7, europium and samarium were added to 1 mole percent praseodymium GGG scintillator material samples in the amount of 150 mole parts per million (ppm) The mole ppm of the Eu or Sm is measured relative to the A site in the $A_3B_5O_{12}$ garnet. The addition of europium or samarium to the 1 mole percent praseodymium GGG scintillator material decreased the afterglow, but also decreased the magnitude of the relative light intensity slightly.

Two other scintillator samples (not listed in Table 1) were prepared to determine the effect of adding thulium on the radiation damage properties of the scintillator material. Both of these samples contained 1 mole percent praseodymium. However, the first sample included no thulium, while the second sample included 0.25 mole percent thulium, measured relative to the A site in the $A_3B_5O_{12}$ garnet. The relative scintillating light intensity of the thulium containing sample was about 10% lower than that of the sample without thulium. However, the radiation damage was about 25% lower in the thulium containing sample. The afterglow at 100 milliseconds was also lower in the thulium containing sample by about 40%. Thus, the addition of thulium decreased both the radiation damage and afterglow in GGG.

In addition to the GGG and the gadolinium scandium gallium garnet samples described above, other cubic garnets may be prepared by this process, such as gadolinium scandium aluminum garnet, lutetium aluminum garnet, and yttrium gallium garnet.

Figure 3:
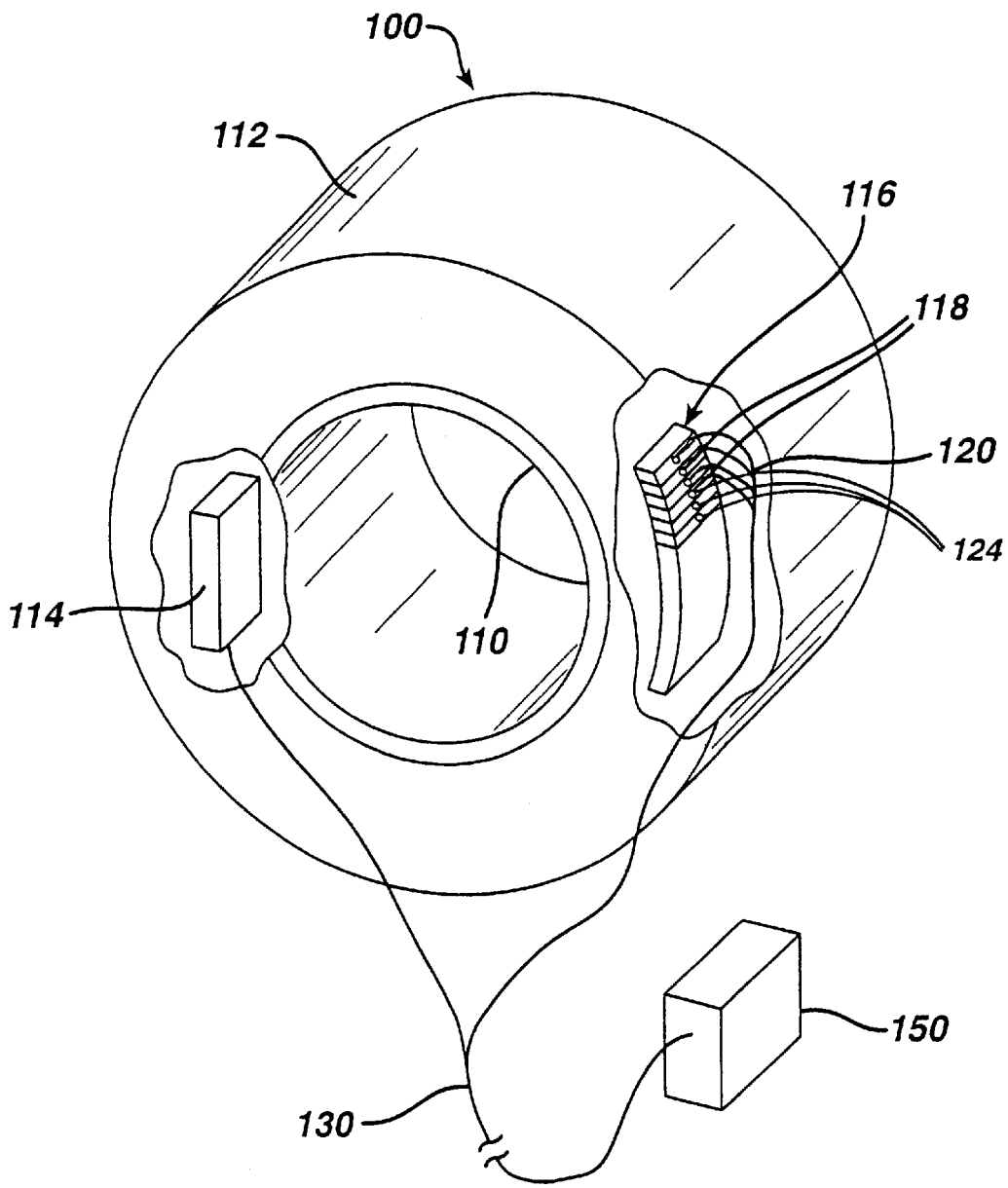
FIG. 3 is a stylized perspective of a portion of a CT machine containing a fast response scintillator material according to an embodiment of this invention.

A computed tomography (CT) scanning system 100 is illustrated schematically in FIG. 3. This CT scanning system 100 comprises a cylindrical enclosure 110 in which the patient or object to be scanned is positioned. A gantry 112 surrounds the cylinder 110 and is configured for rotation about the cylinder's axis. The gantry 112 may be designed to revolve for one full revolution and then return or may be designed for continuous rotation, depending on the system used to connect the electronics on the gantry to the rest of the system. The electronics on the gantry include an x-ray source 114 which preferably produces a fan x-ray beam which encompasses a scintillation detector system 116 mounted on the gantry on the opposite side of the cylinder 110. The fan pattern of the x-ray source is disposed in the plane defined by the x-ray source and the scintillation detector system 116.

The scintillation detector system 116 is very narrow or thin in the direction perpendicular to the plane of the x-ray fan beam. Each cell 118, in an array of cells, of the scintillation detector system incorporates a solid transparent bar of a scintillator material and a photodetector 124, such as a photodetector diode optically coupled to that scintillator bar. The x-ray scintillator has a cubic garnet host and praseodymium as a luminescent activator within the cubic garnet host. As discussed above, appropriate cubic garnet hosts for the scintillator material of this invention include gadolinium gallium garnet, gadolinium scandium gallium garnet, gadolinium scandium aluminum garnet, lutetium aluminum garnet, and yttrium gallium garnet.

The output from each photodetector diode is connected to an operational amplifier which is mounted on the gantry. The output from each operational amplifier is connected either by individual wires 120 or by other electronics to the main control system 150 for the computed tomography system. In the illustrated embodiment, power for the x-ray source and signals from the scintillation detector are carried to the main control system 150 by a cable 130. The use of the cable 130 generally limits the gantry to a single full revolution before returning to its original position.

Alternatively, slip rings or optical or radio transmission may be used to connect the gantry electronics to the main control system 150 where continuous rotation of the gantry is desired. In CT scanning systems of this type, the scintillator material is used to convert incident x-rays to luminescent light which is detected by the photodetector diode and thereby converted to an electrical signal as a means of converting the incident x-rays to electrical signals which may be processed for image extraction and other purposes.

Figure 4:
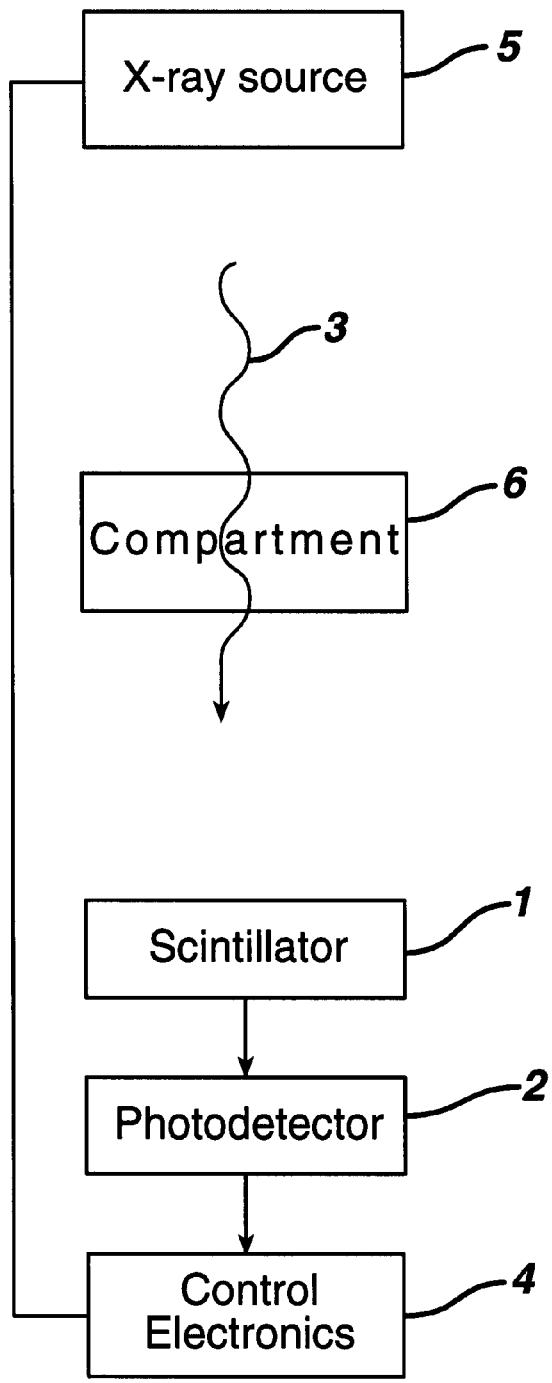
FIG. 4 is a schematic of a fast response x-ray detector system according to another embodiment of this invention.

FIG. 4 is a schematic according to an embodiment of the present invention where the scintillator material is incorporated into a fast response x-ray detector system. The x-ray detector system includes an x-ray scintillator material 1, where the x-ray scintillator has a cubic garnet host and praseodymium as a luminescent activator within the cubic garnet host. As discussed above appropriate cubic garnet hosts for the scintillator material of this invention include gadolinium gallium garnet, gadolinium scandium gallium garnet, gadolinium scandium aluminum garnet, lutetium aluminum garnet, and yttrium gallium garnet.

The scintillator material 1 absorbs x-ray photons 3 and emits scintillating radiation which is detected by the scintillating radiation photodetector 2. The scintillating radiation photodetector 2 may be, for example, a photodiode, or photomultiplier. Preferably the response time of photodetector 2 is faster than the primary decay time of the scintillating radiation in the scintillator material 1 to take advantage of the short primary decay time of the scintillator material 1.

The scintillator material 1 is optically coupled to the photodetector 2. The scintillator material 1 may be optically coupled to the photodetector 2 simply by placing the scintillator material 1 physically adjacent the photodetector 2. Alternatively, the scintillator material 1 may be optically coupled to the photodetector 2 by lens and/or mirrors to focus the scintillating radiation upon the photodetector 2. In yet another alternative, the scintillator material may be optically coupled to the photodetector 2 by means of optical fibers which transmit the scintillating radiation from the scintillator material 1 to the photodetector. Another alternative is to bond the scintillator material directly to the photodetector with an optical glue.

The photodetector 2 may be a single detector or may be an array of detector elements. In the instance that the photodetector 2 is an array of detector elements, it is preferable that the scintillator material include some means of channeling the scintillating radiation from a region of the scintillator emitting scintillating radiation directly to the detector element directly underlying that region of the scintillator material. For instance, as with the embodiment of the invention of FIG. 3, the scintillator material may be made up of separate solid transparent bars. These bars may be coated with a material to prevent the scintillation radiation from passing between the bars.

The electronic signal output of the photodetector is ultimately connected to control electronics 4. The electronic signal output may be amplified by an operational amplifier (not shown), as with the embodiment of FIG. 3, prior to being input to the control electronics. The control electronics 4 collects the output signals from the photodetector 2 corresponding to detection of scintillating radiation. The collected output signals may be further processed to produce an image corresponding to the detected x-rays as is well known in the art.

The x-ray detector system of this embodiment may also include an x-ray source 5 which directs x-rays towards the scintillator material 1. However, it is not necessary that the x-ray detector system include an x-ray source 5. Instead, the x-ray source may be external to the x-ray detector system, or the x-rays may emanate from the object to be studied. For example, in x-ray detection applications such as astrophysics applications, x-rays may emanate from a body beyond the earth. If the x-ray detector system includes an x-ray source 5, the control electronics 4 may include a power source for supplying power to the x-ray source.

The x-ray detector system may also include a compartment 6 for holding an object to be studied. The compartment 6 is located between the x-ray source 5 and the scintillator material 1. The dimensions of the compartment 6 will depend upon the particular application. For instance, an x-ray detector system for baggage inspection should be of a size to accommodate baggage, while an x-ray detector system for medical imaging should be of a size to accommodate a human being or animal.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A transparent solid scintillator material comprising:
    a cubic garnet host material; and
    praseodymium distributed within the cubic garnet host material, wherein the praseodymium acts as an activator which luminesces in response to stimulating x-ray radiation.

2. The transparent solid scintillator material of claim 1, wherein
    the cubic garnet host is selected from the group consisting of gadolinium gallium garnet, gadolinium scandium gallium garnet, gadolinium scandium aluminum garnet, lutetium aluminum garnet and yttrium gallium garnet.

3. The transparent solid scintillator material of claim 2, wherein
    the cubic garnet host is gadolinium gallium garnet.

4. The transparent solid scintillator material of claim 3, wherein
    the praseodymium is in the gadolinium gallium garnet in a concentration range of 0.01 to 5.0 mole percent relative to the gadolinium.

5. The transparent solid scintillator material of claim 4, wherein
    the praseodymium is in the gadolinium gallium garnet in a concentration range of 0.5 to 2.0 mole percent relative to the gadolinium.

6. The transparent solid scintillator material of claim 1, further comprising:
    an afterglow reducing element distributed within the cubic garnet host material.

7. The transparent solid scintillator material of claim 6, wherein
    the cubic garnet host material is gadolinium gallium garnet and the afterglow reducing element is selected from the group consisting of yttrium, thulium, ytterbium, samarium and europium.

8. The transparent solid scintillator material of claim 7, wherein the afterglow reducing element has a concentration in the cubic garnet host of about 150 mole parts per million.

9. A transparent solid scintillator material comprising:
a cubic garnet host material;
praseodymium distributed within the cubic garnet host material, wherein the praseodymium acts as an activator which luminesces in response to stimulating x-ray radiation; and
a radiation damage-reducing element distributed within the cubic garnet host material.

10. The transparent solid scintillator material of claim 9, wherein
the radiation damage reducing element is thulium.

11. A computed tomography system comprising:
an x-ray source;
a solid scintillator material including
a cubic garnet host material, and
praseodymium distributed within the cubic garnet host material,
where the praseodymium acts as an activator;
and a scintillating radiation detector optically coupled to the solid scintillator material for detecting the scintillating radiation.

12. The computed tomography system of claim 11, wherein the scintillating radiation detector comprises an array of photodetector cells.

13. The computed tomography system of claim 11, wherein the scintillating radiation detector comprises at least one photodiode.

14. The computed tomography system of claim 13, wherein the at least one photodiode is an array of photodiodes.

15. The computed tomography system of claim 12, further comprising:
a control system coupled to the array of photodetector cells for receiving signals output from the photodetector cells in response to the scintillating radiation.

16. The computed tomography system of claim 11,
wherein the cubic garnet host is selected from the group consisting of gadolinium gallium garnet, gadolinium scandium gallium garnet, gadolinium scandium aluminum garnet, lutetium aluminum garnet and yttrium gallium garnet.

17. The computed tomography system of claim 16,
wherein the cubic garnet host is gadolinium gallium garnet.

18. The computed tomography system of claim 17, wherein
the praseodymium is in the gadolinium gallium garnet in a concentration range of 0.01 to 5.0 mole percent relative to the gadolinium.

19. The computed tomography system of claim 18, wherein
the praseodymium is in the gadolinium gallium garnet in a concentration range of 0.5 to 2.0 mole percent relative to the gadolinium.

20. The computed tomography system of claim 17, wherein
the transparent solid scintillator material further includes an afterglow reducing element distributed within the cubic garnet host material.

21. A fast response x-ray detector system comprising:
a solid scintillator material including a cubic garnet host material, and praseodymium distributed within the cubic garnet host material, where the praseodymium acts as an activator; and
a scintillating radiation detector optically coupled to the solid scintillator material for detecting the scintillating radiation.

22. The fast response x-ray detector system of claim 21,
wherein the cubic garnet host is selected from the group consisting of gadolinium gallium garnet, gadolinium scandium gallium garnet, gadolinium scandium aluminum garnet, lutetium aluminum garnet and yttrium gallium garnet.

23. The fast response x-ray detector system of claim 22,
wherein the cubic garnet host is gadolinium gallium garnet.

24. The fast response x-ray detector system of claim 23, wherein
the praseodymium is in the gadolinium gallium garnet in a concentration range of 0.01 to 5.0 mole percent relative to the gadolinium.

25. The fast response x-ray detector system of claim 24, wherein
the praseodymium is in the gadolinium gallium garnet in a concentration range of 0.5 to 2.0 mole percent relative to the gadolinium.

26. The fast response x-ray detector system of claim 23, wherein
the solid scintillator material further includes an afterglow reducing element distributed within the cubic garnet host material.

27. The fast response x-ray detector system of claim 21 wherein the scintillating radiation detector is one of a photodiode and a photomultiplier.

28. The fast response x-ray detector system of claim 21, wherein the scintillator material is optically coupled to photodetector by being physically adjacent the photodetector.

29. The fast response x-ray detector system of claim 21, wherein the scintillator material is optically coupled to photodetector by means of optical fibers which transmit the scintillating radiation from the scintillator material to the photodetector.

30. The fast response x-ray detector system of claim 21, wherein the photodetector comprises an array of detector elements.

31. The fast response x-ray detector system of claim 21, further comprising:
control electronics which collect the output signal from the photodetector corresponding to detection of the scintillating radiation.

32. The fast response x-ray detector system of claim 21, further comprising:
an x-ray source for directing x-rays toward the scintillator material.

33. The fast response x-ray detector system of claim 32, further comprising:
a compartment for holding an object to be studied located between the x-ray source and the scintillator material.

34. A phosphor powder comprising:
a cubic garnet host material;
praseodymium distributed within the cubic garnet host material, wherein the praseodymium acts as an activator which luminesces in response to stimulating x-ray radiation; and
an afterglow-reducing element distributed within the cubic garnet host material.

35. The phosphor powder of claim 34, wherein
the cubic garnet host is selected from the group consisting of gadolinium gallium garnet, gadolinium scandium gallium garnet, gadolinium scandium aluminum garnet, lutetium aluminum garnet and yttrium gallium garnet.

36. The phosphor powder of claim 35, wherein
the cubic garnet host is gadolinium gallium garnet.

37. The phosphor powder of claim 36, wherein
the praseodymium is in the gadolinium gallium garnet in a concentration range of 0.01 to 5.0 mole percent relative to the gadolinium.

38. The phosphor powder of claim 37, wherein
the praseodymium is in the gadolinium gallium garnet in a concentration range of 0.5 to 2.0 mole percent relative to the gadolinium.

39. The phosphor powder of claim 34, wherein
the cubic garnet host material is gadolinium gallium garnet and the afterglow reducing element is selected from the group consisting of yttrium, thulium, ytterbium, samarium and europium.

* * * * *